United States Patent [19]

Andersen

[11] Patent Number: 5,432,442
[45] Date of Patent: Jul. 11, 1995

[54] SPEED SENSOR INCLUDING OUTPUT SIGNAL PROPORTIONAL TO AIR GAP SIZE

[75] Inventor: Robert G. Andersen, Troy, Mich.

[73] Assignee: ITT Corporation, New York, N.Y.

[21] Appl. No.: 99,980

[22] Filed: Jul. 30, 1993

[51] Int. Cl.⁶ .......................... G01P 3/42; G01P 3/48; G01P 3/54

[52] U.S. Cl. .................... 324/174; 324/160; 324/173; 324/166

[58] Field of Search ............ 324/207.13, 207.15, 324/207.12, 207.20, 207.21, 207.25, 173, 174, 239, 225, 160, 161, 163–166; 307/106, 120; 340/441; 364/565, 566

[56] References Cited

U.S. PATENT DOCUMENTS

| | | | |
|---|---|---|---|
| 4,274,054 | 6/1981 | Savidge et al. | 324/225 |
| 4,764,685 | 8/1988 | Bleckmann . | |
| 4,972,145 | 11/1990 | Wood et al. | 324/225 |
| 5,001,363 | 3/1991 | Arami | 324/207.12 |
| 5,012,207 | 4/1991 | Edwards | 324/225 |
| 5,130,651 | 7/1992 | Morrey, Jr. | 324/225 |

FOREIGN PATENT DOCUMENTS

5-113949 2/1980 Japan ................ 324/225

*Primary Examiner*—Sandra L. O'Shea
*Assistant Examiner*—R. Phillips
*Attorney, Agent, or Firm*—Dykema Gossett

[57] ABSTRACT

An air gap detector for use in antilocking brake systems includes an active integrator that integrates an output signal from a wheel speed sensor, that depends in part on the relative spacing between the wheel axle and its associated bearing, to thereby produce a signal that is inversely proportional to the air gap between the axle and bearing. The integrated signal is processed by peak detecting means to produce a peak signal that is proportional to the size of the air gap. The peak signal is then amplified and adjusted to produce a D.C. signal that is proportional to the size of the air gap.

23 Claims, 4 Drawing Sheets

SPEED SENSOR INCLUDING OUTPUT SIGNAL PROPORTIONAL TO AIR GAP SIZE

BACKGROUND OF THE INVENTION

1. Field of the Invention

This invention relates generally to a system for determining the size of the air gap associated with a wheel speed sensor used in antilocking brake systems. More specifically, this invention relates to a device and methodology for monitoring the output of a wheel speed sensor associated with an antilocking brake system and for producing a D.C. voltage proportional to the air gap associated with that wheel and sensor such that the size of the air gap is determined.

2. Description of the Prior Art

Vehicle antilocking brake systems typically include a wheel speed sensor. A wheel speed sensor provides information about the speed of each wheel of the vehicle, for example, so the antilocking brake system electronic controller can determine whether or not a "lock up condition" exists. Conventional wheel speed sensors include a magnet and a coil that produce a magnetic field that interacts with an apparatus such as a tone wheel that rotates with the vehicle wheel. The tone wheel typically includes teeth or gearing that interacts with the magnetic field produced by the magnet and coil. The conditions of the magnetic field are indicative of the speed of the wheel. As the tone wheel rotates relative to the magnet and coil, the interaction of the teeth with the magnetic field cause changes within that field that affect the output signal of the wheel speed sensor. Therefore, the frequency of the sensor signal varies with the speed of the rotation of the wheel.

The output of the wheel speed sensor depends on the rotation of the wheel and the concomitant rotation of the tone wheel. The output of the sensor also depends on the distance between the tone wheel teeth and the magnet and coil in the wheel speed sensor housing. The distance between the sensor and the wheel is conventionally known as the air gap. Movement of the axle, associated with the wheel, relative to its bearing causes the tone wheel to move relative to the wheel speed sensor. Such movement of the tone wheel causes undesirable changes within the wheel speed sensor output, and in some cases introduces error into wheel speed detection. When the wheel axle moves relative to its bearing, the gap is changed between the wheel and the sensor. Information regarding an air gap can be useful in determining whether the wheel speed sensor output is reliable or whether undesirable error has been introduced through the change in the air gap. Therefore, monitoring an air gap in an antilocking brake system provides useful information.

One system used for monitoring an air gap requires the wheel speed sensor peak to peak voltage to be recorded. A peak to peak voltage is then measured with a ruler from the recording and the air gap is calculated from this information and knowledge of the wheel speed sensor sensitivity. Another air gap detector includes an active integrator that converts the wheel speed sensor output signal to a constant amplitude signal. This A.C. voltage signal is then converted and calculations must be performed to actually measure an air gap. These systems are typically cumbersome and include time consuming procedures and introduce potential errors into air gap measurement.

This invention avoids the cumbersome apparatus and procedures required in using the conventional devices described above. Further, this invention seeks to provide an air gap signal that is directly proportional to the air gap within an antilocking brake system wheel assembly which may be caused by relatively rough road conditions, for example.

SUMMARY OF THE INVENTION

This invention includes a system for determining the size of an air gap within a wheel speed monitoring assembly. The system includes a rotating member that rotates at the same rotational speed as a wheel associated with the assembly. The rotating member cooperates with means for sensing the rotating speed of the rotating member and for producing a speed signal. The speed signal is processed by means for integrating the speed signal and for producing an integrated signal that is inversely proportional to the air gap. The integrated signal is processed by means for detecting a peak voltage within the integrated signal and for producing a peak signal that is proportional to said peak voltage. The peak signal is fed to means for amplifying the peak signal and for producing an output signal that is proportional to the air gap. In this manner, the size of the air gap is determined.

A preferred embodiment of the system just described also includes means for rectifying the integrated signal coupled between the integrating means and the detecting means. The rectifying means inverts any negative portions of the integrated signal such that the detecting means receives a signal having a positive amplitude.

A method, associated with this invention, of determining whether a rotational speed sensor is monitoring the rotational speed of a rotating member free of error introduced by an undesirable change in the air gap between the sensor and the rotating member includes three basic steps. First, integrating the speed sensor output to thereby produce an integrated signal that is inversely proportional to the air gap. Second, locating a peak voltage within the integrated signal to thereby produce a peak signal that is proportional to the peak voltage. Third, amplifying the peak signal to thereby produce an output signal that is proportional to the air gap. In this manner, the error introduced into the sensor signal by the undesirable change in the air gap is determined.

These and other features and objects of this invention will become apparent to one skilled in the art from the following detailed description of the preferred embodiments in conjunction with the appended drawings, of which the following is a brief description.

DETAILED DESCRIPTION OF THE PREFERRED EMBODIMENTS

Figure 1:
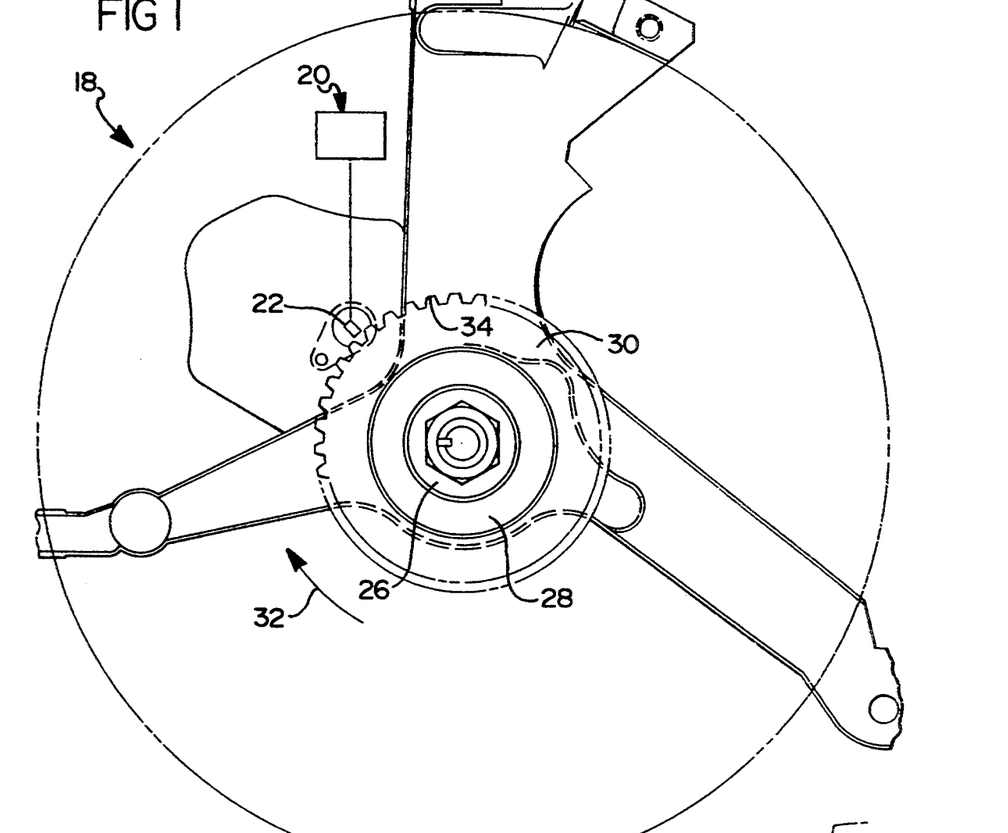
FIG. 1 is a diagramatic partial sectional view of a vehicle wheel assembly.

FIG. 1 diagramatically and schematically illustrates wheel assembly 18. Wheel assembly 18 includes air gap detector 20 which is in communication with wheel speed sensor 22. Air gap detector 20 is useful for measuring an air gap change that is brought about by relative movement between axle 26 and bearing 28. Axle 26 may move radially relative to bearing 28 under rough road conditions, for example. Wheel speed sensor 22 cooperates with tone wheel 30 which is mounted in a conventional manner such that it rotates in unison with a vehicle wheel (not shown) property mounted on axle 26. When the vehicle wheel and tone wheel 30 rotate in the direction of arrow 32 teeth 34 on tone wheel 30 effectively cause the output amplitude and frequency of wheel speed sensor 22 to be proportional to the speed of rotation.

Figures 2A, 2B:
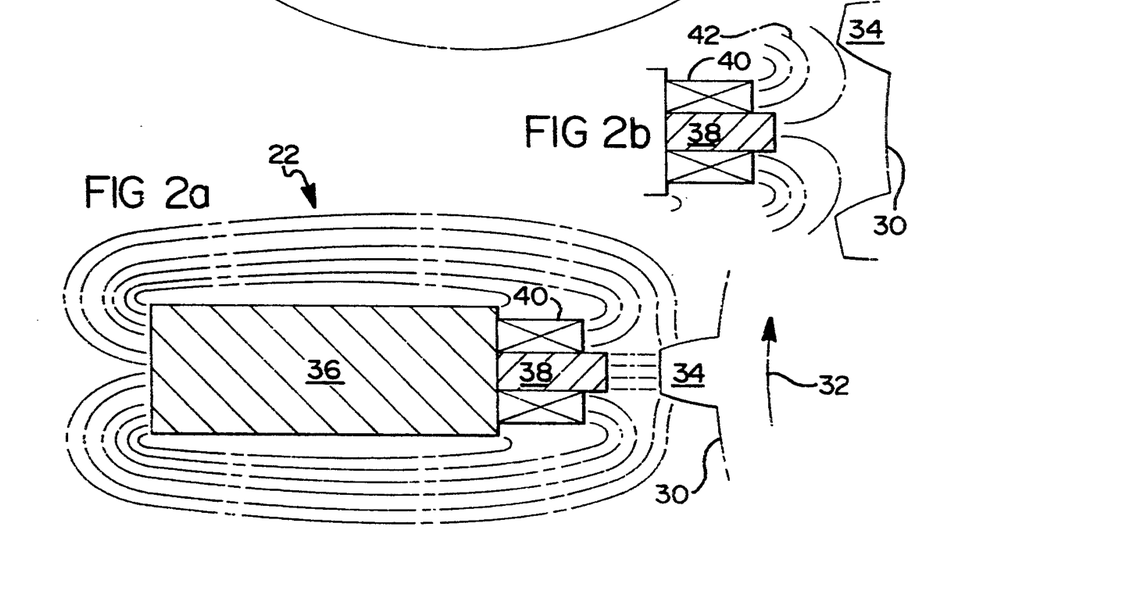
FIGS. 2(a) and 2(b) are schematic illustrations of a wheel speed sensor.

FIGS. 2(a) and 2(b) show, in more detail, the function of wheel speed sensor 22. Wheel speed sensor 22 includes magnet 36, pole piece 38 and coil 40. Magnet 36 provides a permanent magnetic field indicated schematically by magnetic field lines 42. FIGS. 2(a) and 2(b) illustrate how the magnetic field is changed by the approach and passing of a discontinuity such as the teeth 34 on tone wheel 30. Passage of teeth 34 near sensor 22 causes a change in the magnetic field which therefore induces a current in coil 40. The characteristics of the electrical signal produced by sensor 22 will vary with the shape of tone wheel 30. Typically the electrical signal will be sinusoidal. The voltage magnitude and frequency of the wheel speed sensor signal are directly proportional to the speed of rotation of tone wheel 30. The wheel speed sensor output signal also depends on the spacing between sensor 22 and tone wheel 30 conventionally known as the air gap. Tone wheel 30 must be a ferromagnetic material and is preferably carbon steel, magnetic stainless steel, or iron. Tone wheel 30 can be fashioned through conventional processes such as stamping or machining of the chosen material.

Figure 3:
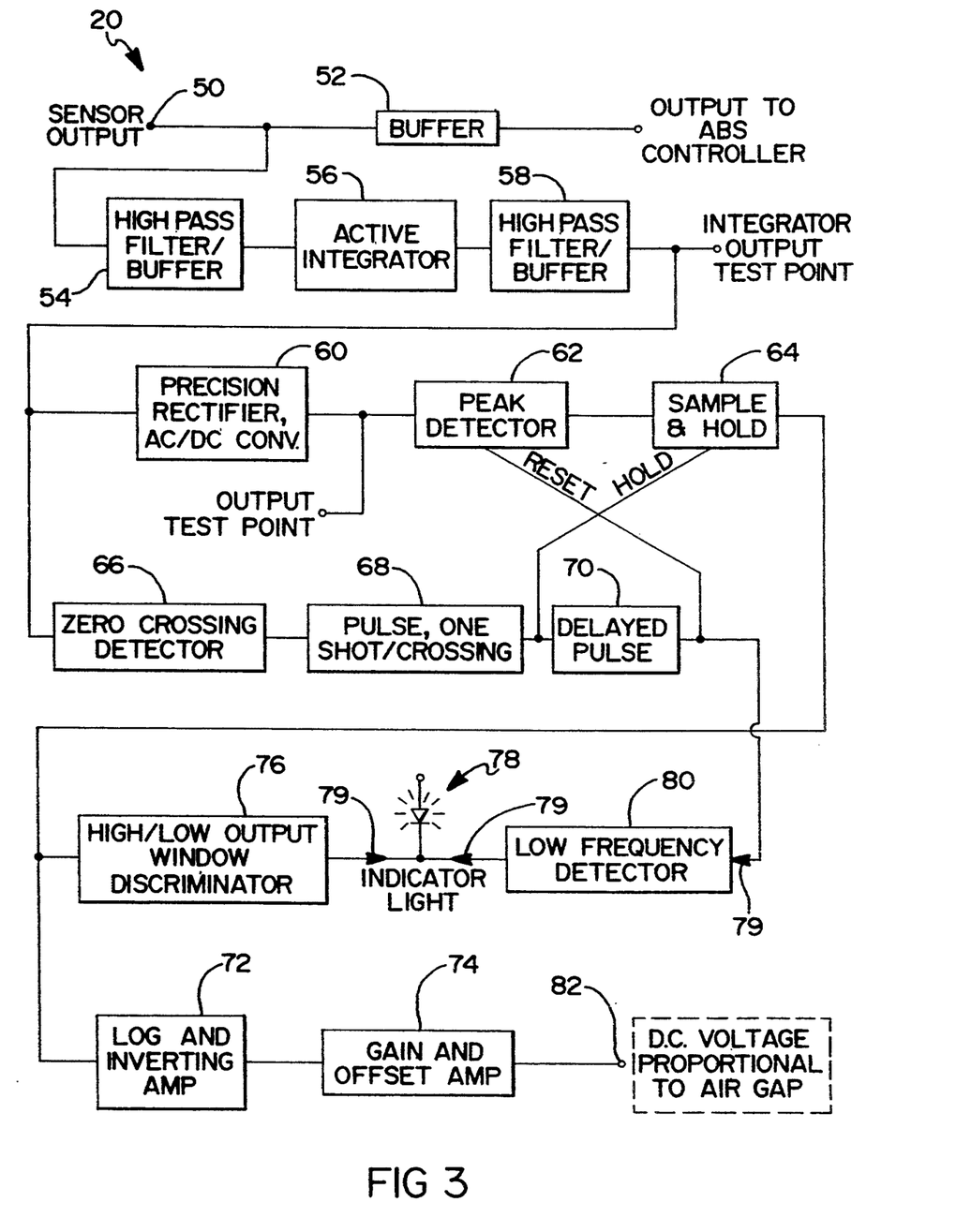
FIG. 3 is a block diagram illustrating an air gap detector system.

FIG. 3 illustrates, in block diagram form, an electronic air gap detector system designed in accordance with this invention. Reference will be made to FIGS. 4(a) through 4(f) throughout the description of the air gap detector system to illustrate the relationship between the various signals processed in the system relative to time. Wheel speed sensor 22 has an output 50 that is utilized by air gap detector 20. Buffer 52 is provided between the coupling of air gap detector 20 and wheel speed sensor 22 and the antilocking brake system (ABS) electronic controller (not shown) to serve as a means for isolating air gap detector 20 from the ABS controller. Buffer 52 provides circuitry isolation such that air gap detector 20 does not interfere with the communications between the ABS controller and wheel speed sensor 22. Circuitry isolation is needed because the ABS controller typically continuously reads an output signal from sensor 22. Buffer 52 preferably has a high input impedance and an output impedance that matches the output impedance of wheel speed sensor 22. In this manner, signal processing by air gap detector 20 will be transparent to the ABS controller. In one embodiment, the output impedance of buffer 52 is nominally 1100 ohms.

Air gap detector 20 includes high pass filter 54 that serves as a means for removing the lower frequencies from the signal generated by the wheel speed sensor. High pass filter 54 preferably removes signals that are approximately 5 Hertz or below. High pass filter 54 preferably includes a buffing means for providing isolation between wheel speed sensor 22 and the circuitry within air gap detector 20. The signals processed by high pass filter 54 are received by active integrator 56.

The wheel speed sensor output voltage is directly proportional to wheel speed and inversely proportional to the distance between coil 40 and tone wheel 30; i.e. the air gap. The amplitude and frequency of wheel speed sensor output 50 increase with increasing wheel speed. The rate of increase in amplitude relative to the frequency is 20 dB per decade. Active integrator 56 has a natural frequency response such that it reduces amplitudes at a rate of 20 dB per decade of frequency increase. Accordingly, an increasing frequency and amplitude in the output signal 50 of wheel speed sensor 22 causes active integrator 56 to produce a constant amplitude output signal. Similarly, an output from wheel speed sensor 22 with a decreasing frequency and amplitude causes a constant amplitude output signal from active integrator 56. Therefore, the output of active integrator 56 is a constant amplitude regardless of the frequency of the signal 50 produced by wheel speed sensor 22 but the output of active integrator 56 does change when the air gap is changed.

Figure 5:
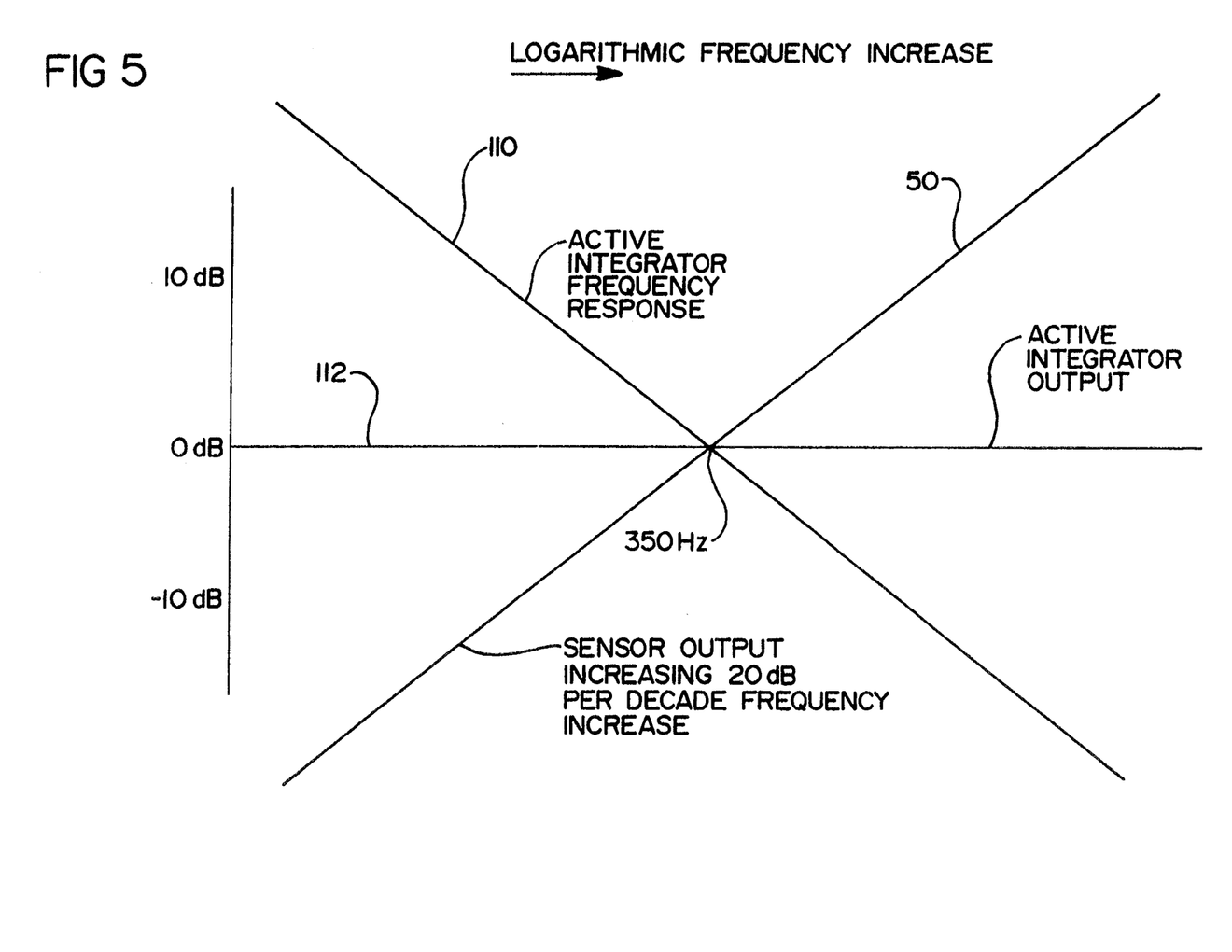
FIG. 5 illustrates the response of the active integrator of FIG. 3 to the wheel speed sensor output.

FIG. 5 illustrates the relationship between the sensor output 50, the active integrator natural frequency response 110 and the active integrator output 112 on a logarithmic scale. As can be seen, curves 50 and 110 intersect curve 112 at an approximate frequency of 350 Hertz.

Active integrator 56 includes an operational amplifier preferably having a gain of 1 and an operating frequency of approximately 250–350 Hertz. Active integrator 56 also preferably attenuates signal frequencies greater than 350 Hertz and amplifies signal frequencies less than 350 Hertz. The output of active integrator 56 is fed through high pass filter 58 that serves as a means for attenuating the relatively low frequencies within the output signal from active integrator 56.

Figures 4A, 4B:
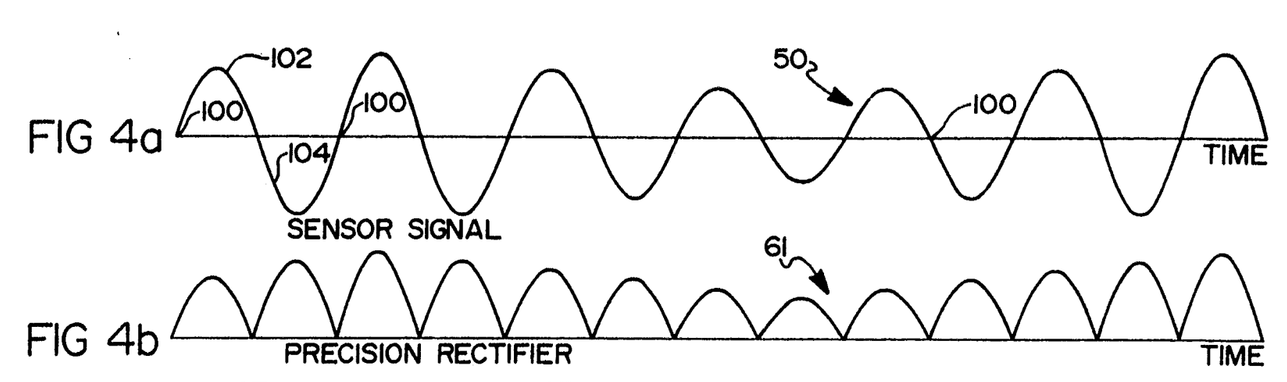
FIGS. 4(a) through 4(f) illustrate the relationship between the various signals propagated through the system of FIG. 3 relative to time.
Figure 4C:
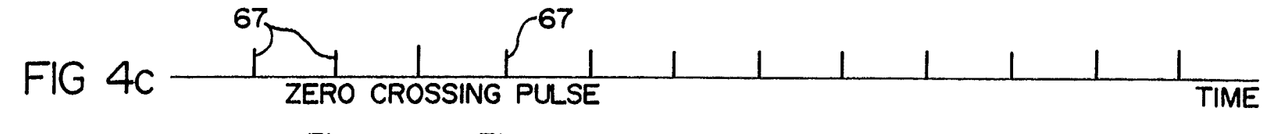
Figure 4D:
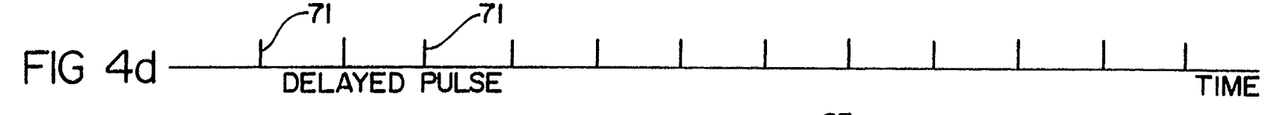
Figure 4E:
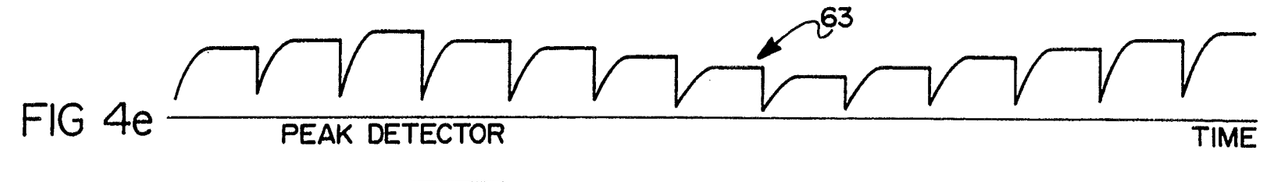

The filtered output signal from active integrator 56 is rectified by precision rectifier 60. Precision rectifier 60 effectively performs an A.C. to D.C. conversion of the filtered output from active integrator 56. Precision rectifier 60 passes the positive portion of the A.C. signal in an unaltered fashion and inverts the negative portion of the A.C. wave to thereby produce a signal 61 as illustrated in FIG. 4(b). Peak detector 62 serves as part of a means for locating the peak voltages within the rectified signal produced by precision rectifier 60. The output signal from peak detector 62 is illustrated as signal 63 in FIG. 4(e). Sample and hold means 64 captures the peak voltage signal produced by peak detector 62 and holds that value at a constant until sample and hold means 64 is properly reset as further described below.

The filtered output signal from active integrator 56 is simultaneously processed by zero crossing detector 66 and precision rectifier 60. Zero crossing detector 66 serves as part of a means for producing a pulse output signal 67 (FIG. 4(c)) each time the integrator signal has a zero value. Pulse generator 68 produces a one shot signal 67 for each zero crossing within the active integrator signal which corresponds to the zero crossings within sensor signal 50. Zero crossing detector 66 and pulse generator 68 cooperate to produce a single pulse for each zero crossing within the integrator signal; regardless of whether the integrator signal is passing from positive to negative or negative to positive values.

The pulse generated by pulse generator 68 resets sample and hold means 64 such that sample and hold means 64 is capable of receiving a new peak value from peak detector 62. Delayed pulse means 70 produces a one shot signal 71 (FIG. 4(d)) and preferably introduces a delay into the circuit signal processing such that a pulse 71 resets peak detector 62 five milliseconds after the pulse 67 that resets sample and hold means 64. Once peak detector 62 is reset to zero, it is capable of determining the next peak within the signal 61 produced by precision rectifier 60.

Figure 4F:
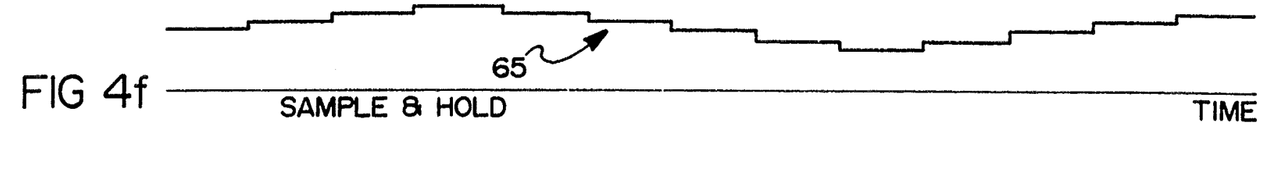

The output of 65 (FIG. 4(f)) sample and hold means 64 is then processed by logarithmic amplifier 72. The output 65 of sample and hold means 64 is effectively a string of steps that represent the maximum voltable values of the signal produced by active integrator 56 as a continuous step function. If the output of active integrator 56 has a constant amplitude then the output signal 65 from sample and hold means 64 would be a flat line maintaining a constant value. A nonconstant amplitude within the signal produced by active integrator 56 corresponds to a stepped output signal 65 from sample and hold means 64. The output of sample and hold means 64 is timed to be one cycle behind the actual signal produced by active integrator 56. Logarithmic amplifier 72 amplifies the output of sample and hold means 64 to produce an output that is directly proportional to the air gap between tone wheel 30 and sensor 22. The amplification within logarithmic amplifier 72 includes inverting the output of sample and hold means 64. Buffer means 74 provides additional amplification to the signal produced by logarithmic amplifier 72 to provide proper gain and offset adjustments for fine tuning the signal such that it is directly proportional to the air gap. Therefore, the output from buffer means 74 is a D.C. signal having a voltage that is directly proportional to the size of the air gap in conventional units. For example, the components of air gap detector 20 could be selected to provide an output signal that indicates a 1 mm air gap when the output voltage is 1 volt and a 1.5 mm air gap when the output voltage is 1.5 volts, etc.

The output of sample and hold means 64 is also processed by discriminator means 76. Discriminator means 76 serves as a means for producing an activator signal whenever the D.C. voltage within the sample and hold means output signal goes below a preselected minimum or above a preselected maximum. The activator signal produced by discriminator means 76 serves to turn on indicator lamp 78. Direction arrows 79 illustrate the direction of signal flow in FIG. 3. The output signals of discriminator means 76 and detecting means 80 (described below) only activate indicator lamp 78 as desired. There is no feedback to delayed pulse generator 70 or sample and hold means 64.

Indicator lamp 78 is provided to indicate when the air gap formed within wheel assembly 18 is too high or undesirably low and, therefore, air gap detector 20 may not be functioning specifically as desired. For example, indicator lamp 78 is provided on a test box, containing air gap detector 20. In this embodiment, indicator lamp 78 would be used by a service or engineering testing technician to serve as a signal to the technician that the measurement achieved through air gap detector 20 is in question for some reason.

Indicator lamp 78 is also activated by an actuation signal produced by detecting means 80 under preselected conditions. In one embodiment detector means 80 includes an integrator that produces an actuation signal when the frequency of the output signal produced by delayed pulsing means 70 goes below a preselected minimum thereby indicating a potential inaccuracy. In this manner, an air gap detector designed in accordance with this invention can provide a variety of means for indicating that the air gap measurement may be inaccurate.

In another preferred embodiment, an additional switching means (not shown) is provided for selectively activating pulse generator 68. The switching means could be incorporated into zero crossing detector 66 or be added external to the components shown in FIG. 3. The additional switching means selectively activates pulse generator 68 such that pulse generator 68 only produces an output pulse signal upon a positive-going zero crossing within the active integrator output signal. Otherwise, the function of air gap detector 20 remains the same as described above.

The decision whether to incorporate the additional switching means depends, in part, on the components of wheel assembly 18. When a precisely machined tone wheel 30 is used, precision rectifier 60 will perform as desired, however, when a less accurate tone wheel is employed, undesirable error may be introduced. For example, when tone wheel 30 is formed by a single stamping, it may not have as precise a periphery or surface as a machined tone wheel. In particular, the spaces between the teeth on a tone wheel formed by a single stamping may vary in size relative to each other or contain slight imperfections and thereby introduce undesirable variations in a magnetic field produced within wheel speed sensor 22 such that the output signal of wheel speed sensor 22 will have errors due to the imperfections in tone wheel 30. Using precision rectifier 60 and pulse generator 68 without the additional switching means and a stamped tone wheel may compound any errors introduced by the imperfections in such a tone wheel. However, selectively activating pulse generator 68 avoids potential problems associated with a stamped tone wheel.

Pulse generator 68 is selectively activated in this latter preferred embodiment to produce a pulse only upon positive-going zero crossings 100 in signal 50 because of the relationship between the surface of tone wheel 30 and the output signal 50 of wheel sensor 22 and, therefore, active integrator 56. The positive portion 102 of each cycle within the sensor output signal 50 is associated with the passage of teeth 34 past sensor 22. The negative portion 104 of each cycle within the sensor output signal is associated with the passage of the spaces between teeth 34 past sensor 22. The problems associated with a stamped tone wheel are most likely associated with the spaces between teeth 34. Therefore, effectively ignoring the passage of the portions between teeth 34 by selectively activating pulse generator 68 only for the positive portions 102 of the sensor output signal 50 eliminates potential inaccuracies otherwise associated with a stamped tone wheel 30. Accordingly, the output from peak detector 62 and sample and hold means 64 would be altered from those illustrated in FIGS. 4(e) and 4(f). A precisely machined wheel does not present the same potential for error.

The preceding description is exemplary rather than limiting in nature. Variations and modifications are possible without departing from the purview and spirit of this invention, the scope of which is limited only by the appended claims.

What is claimed is:

1. A device for determining if a rotational speed sensor is monitoring the rotational speed of a rotating member free of error introduced by an undesirable change in the air gap between the sensor and the rotating member, comprising:
   means for integrating a sensor signal produced by the speed sensor and for producing an integrated signal that is inversely proportional to the air gap;
   means for locating a peak voltage within said integrated signal and for producing a peak signal that is proportional to said peak voltage; and
   means for amplifying said peak signal and for producing an output signal that is proportional to the air gap, whereby the error introduced into the sensor signal by the undesirable change in the air gap is determined.

2. The device of claim 1, further comprising rectifying means coupled between said integrating means and said detecting means for rectifying said integrated signal to thereby effectively convert said integrated signal from an alternating current signal to a direct current signal.

3. The device of claim 2, wherein said rectifying means inverts the negative portions of said integrated signal.

4. The device of claim 1, wherein said integrating means comprises an integrator amplifier that reduces frequencies within said sensor signal at a rate of approximately 20 decibels per decade.

5. The device of claim 4, wherein said integrating means further comprises amplifying means for amplifying signal frequencies below 350 Hertz and attenuating means for attenuating signal frequencies above 350 Hertz.

6. The device of claim 1, wherein said locating means includes:
   means for determining said peak voltage;
   means for sampling said peak voltage and for producing said peak signal;
   means for detecting zero crossing points within said integrated signal;
   first means for producing a pulse output signal of limited duration responsively to said detecting means detecting a said zero crossing; and
   second means for producing a pulse output signal of limited duration responsively to said first means output signal at a preselected time after said first means output.

7. The device of claim 6, wherein said first producing means output signal resets said sampling means and said second producing means output signal resets said determining means.

8. The device of claim 6, wherein said sampling means produces said peak signal for a preselected period of time.

9. The device of claim 1, wherein said amplifying means comprises a logarithmic amplifier and means for inverting said peak signal.

10. The device of claim 9, wherein said amplifying means further comprises buffer amplifier means for adjusting the gain and offset of said peak signal to thereby produce said output signal.

11. The device of claim 1, further comprising filtering and buffering means coupled between said wheel speed sensor and said integrating means for removing relatively low frequencies from said sensor signal and for isolating said sensor from said device.

12. The device of claim 1, further comprising filtering means coupled between said integrating means and said detecting means for removing relatively low frequencies from said integrated signal.

13. The device of claim 1, further comprising means for monitoring the precision of the measurement of the air gap, said monitoring means including:
   range determining means for determining when said peak signal is outside a preselected range and for producing a first activation signal when said peak signal is outside said preselected range; and
   indicator means coupled to said determining means for indicating that said peak signal is outside said preselected range responsively to said first activation signal.

14. The device of claim 3, further comprising means for monitoring the precision of the measurement of the air gap, said monitoring means including:
   means for integrating said second producing means output signal and for producing a second activation signal when the frequency of said second producing means signal falls below a preselected minimum; and
   indicator means coupled to said integrating means for indicating that said frequency is below said preselected minimum responsively to said second activation signal.

15. A system for determining the size of an air gap within a wheel speed monitoring assembly, comprising:
   a rotating member that rotates at the same rotational speed as a wheel associated with said assembly;
   means for sensing the rotating speed of said rotating member and for producing a speed signal;
   means for integrating said speed signal and for producing an integrated signal that is inversely proportional to the air gap;
   means for detecting, a peak voltage within said integrated signal and for producing a peak signal that is proportional to said peak voltage; and
   means for amplifying said peak signal and for producing an output signal that is proportional to said air gap, whereby the size of the air gap is determined.

16. The system of claim 15, further comprising means for rectifying said integrated signal coupled between said integrating means and said detecting means, said rectifying means inverting any negative portions of said integrated signal such that said detecting means receives a signal having a positive amplitude.

17. A method of determining whether a rotational speed sensor is monitoring the rotational speed of a rotating member free of error introduced by an undesirable change in the air gap between the sensor and the rotating members comprising the steps of:
   (A) integrating and filtering the speed sensor output to thereby produce an integrated signal that is inversely proportional to the air gap;
   (B) locating a peak voltage within said integrated signal to thereby produce a peak signal that is proportional to said peak voltage; and
   (C) amplifying said peak signal to thereby produce an output signal that is proportional to the air gap, whereby the error introduced into the sensor signal by the undesirable change in the air gap is determined.

18. The method of claim 17, wherein step (A) is performed by integrating the wheel speed sensor output and reducing frequencies within said sensor output at a rate of approximately 20 dB per decade.

19. The method of claim 17, wherein step (A) is performed by the substeps of amplifying signal frequencies below 350 Hertz and attenuating signal frequencies above 350 Hertz.

20. The method of claim 17, wherein step (B) is performed by the substeps of:

(1) determining said peak voltage;

(2) sampling said peak voltage to thereby produce said peak signal;

(3) detecting zero crossing points within said integrated signal; and (4) reperforming substeps (1) and (2) responsively to zero crossing point detection in substep (3).

21. The method of claim 17, wherein step (C) is performed by the substeps of:

(1) integrating said peak signal to thereby produce an integrated peak signal;

(2) inverting said integrated peak signal to thereby produce said output signal; and (3) adjusting the gain and offset values associated with said output signal.

22. The method of claim 17, further comprising the step of rectifying said integrated signal to thereby effectively convert said integrated signal from an alternating current signal to a direct current signal prior to performing step (B).

23. The method of claim 17, further comprising the step said monitoring step being performed by the substeps of:

determining when said peak signal is outside a preselected range;

producing an activation signal when said peak signal is outside said preselected range; and indicating that said peak signal is outside said preselected range responsively to said activation signal.

* * * * *

UNITED STATES PATENT AND TRADEMARK OFFICE
CERTIFICATE OF CORRECTION

PATENT NO. : 5,432,442
DATED : Jul. 11, 1995
INVENTOR(S) : Andersen

It is certified that error appears in the above-indentified patent and that said Letters Patent is hereby corrected as shown below:

In claim 15, column 8, line 41, please delete the comma after "detecting";
In claim 17, column 8, line 57, please delete "members" and add --member,--;
In claim 23, column 10, line 13, please delete "said" and insert --of--, and after "monitoring" add --the precision of the measurement of the air gap, said monitoring--.

Signed and Sealed this

Nineteenth Day of March, 1996

Attest:

BRUCE LEHMAN

Attesting Officer     Commissioner of Patents and Trademarks